United States Patent
Frauchiger

(10) Patent No.: US 7,926,877 B2
(45) Date of Patent: Apr. 19, 2011

(54) CASING FOR A HINGE ATTACHMENT OF A CAR SEAT AND METHOD FOR ITS MANUFACTURING

(75) Inventor: Paul Frauchiger, Cincinnati, OH (US)

(73) Assignee: Feintool Intellectual Property AG, Lyss (CH)

( * ) Notice: Subject to any disclaimer, the term of this patent is extended or adjusted under 35 U.S.C. 154(b) by 189 days.

(21) Appl. No.: 11/590,400

(22) Filed: Oct. 31, 2006

(65) Prior Publication Data
US 2007/0234536 A1 Oct. 11, 2007

(30) Foreign Application Priority Data
Mar. 22, 2006 (EP) .................................... 06090036

(51) Int. Cl.
*B60N 2/235* (2006.01)
(52) U.S. Cl. ................ 297/367 L; 297/216.13
(58) Field of Classification Search ................. 297/367, 297/216.13, 366
See application file for complete search history.

(56) References Cited

U.S. PATENT DOCUMENTS

| | | | |
|---|---|---|---|
| 3,678,557 A | 7/1972 | Howard | |
| 4,275,924 A | 6/1981 | Lehmann et al. | |
| 4,573,739 A | 3/1986 | Schoettker | |
| 4,680,979 A | 7/1987 | Morishita et al. | |
| 5,507,553 A * | 4/1996 | Nishizawa et al. | 297/216.13 |
| 5,611,599 A | 3/1997 | Baloche et al. | |
| 5,692,589 A * | 12/1997 | Beguin | 192/39 |
| 5,755,491 A * | 5/1998 | Baloche et al. | 297/362 |
| 5,988,751 A * | 11/1999 | Yoshida et al. | 297/367 |
| 6,016,895 A | 1/2000 | Schwuger et al. | |
| 6,164,723 A * | 12/2000 | Ganot | 297/378.12 |
| 6,318,806 B1 * | 11/2001 | Levert et al. | 297/367 |
| 6,474,734 B1 * | 11/2002 | Masuda et al. | 297/216.13 |
| 6,634,713 B2 * | 10/2003 | Nonomiya et al. | 297/367 |
| 7,380,883 B2 * | 6/2008 | Koumura | 297/367 |
| 7,458,639 B2 * | 12/2008 | Thiel et al. | 297/367 |
| 2002/0096924 A1 * | 7/2002 | Reubeuze | 297/367 |
| 2003/0025376 A1 * | 2/2003 | Moriyama et al. | 297/367 |
| 2004/0145227 A1 * | 7/2004 | Bonk | 297/367 |
| 2005/0056518 A1 * | 3/2005 | Weber | 192/223.1 |
| 2005/0140196 A1 * | 6/2005 | Park et al. | 297/367 |
| 2005/0168034 A1 * | 8/2005 | Fast | 297/367 |
| 2006/0145523 A1 * | 7/2006 | Yamada | 297/367 |
| 2006/0202539 A1 * | 9/2006 | Ohba | 297/367 |
| 2007/0040436 A1 * | 2/2007 | Oki | 297/367 |

FOREIGN PATENT DOCUMENTS

| | | |
|---|---|---|
| DE | 2124 840 | 12/1972 |
| DE | 2834492 | 2/1980 |
| DE | 3227222 | 5/1984 |
| DE | 3244399 | 6/1984 |
| DE | 198 11 096 | 11/1998 |
| DE | 198 53 894 | 5/2000 |
| EP | 0694434 | 1/1996 |
| WO | WO-2007/107382 | 9/2007 |

* cited by examiner

*Primary Examiner* — Sarah B McPartlin
(74) *Attorney, Agent, or Firm* — Jordan and Hamburg LLP

(57) ABSTRACT

In a casing for a hinge attachment of a car seat and to a method for its manufacture, the height of a toothed element is significantly larger than the thickness of walls of the hinge parts and the hinge parts and the toothed element form a statically compact casing unit, which has a distinctly reduced weight and simultaneously has distinctive flexible assembling characteristics, high stability under load and high accuracy. The casing and toothed element are separately produced by fine blanking and both parts are connected through a material connection or an form-fit connection.

23 Claims, 5 Drawing Sheets

CASING FOR A HINGE ATTACHMENT OF A CAR SEAT AND METHOD FOR ITS MANUFACTURING

BACKGROUND OF THE INVENTION

The invention relates to a casing for a hinge attachment of a car seat with a first hinge part firmly connectable to the frame of the back of the seat, a second hinge part firmly connectable to the frame of the seat, wherein the hinge parts, with respective perpendicularly bent off edges abutting each other at their front ends and symmetrically arranged with regard to the hinge axle with formed hollows, form the casing, a toothed element belonging to the casing, the toothing of which at least extends over one segment of the circle and is radially directed to the inner side, and a clamping ring holding together the edges of the hinge parts.

The invention further relates to a method for manufacturing a casing for hinge attachments of a car seat, wherein the hinge parts and a toothed element are largely brought into their final shape by fine blanking and forming, especially by hobbing and drawing, and matched according to dimensions thereof.

Conventional seat adjustment components, e.g. fixed and swivelling hinge parts of hinge attachments, are produced by forming and fine blanking or precision blanking with high dimensional accuracy regarding the finally intended use. These hinge parts have internal toothings or external toothings transmitting rotational movements, which are formed in one piece by ejection (see, for example, DE 32 44 399 C2, DE 28 34 492 C2, DE 32 27 222 C1).

The known state of the art according to DE 32 44 399 C2 attempts to control the minimum dimension of the effective toothed areas necessary for transmitting the rotational movement and the load from one hinge part to the other hinge part by using, for fine blanking, a bigger crimp area than necessary for the ejection area, so that the surplus material to be crimped serves for broadening the respective effective toothed area in excess of the thickness of the source material. This leads to a minor broadening of the teeth in excess of the source material but also to an attenuation of the material between crimped and ejected area. Therefore, fractures in the event of sudden loads cannot be excluded.

Moreover, no significant reductions of the effective thickness of the hinge parts can be achieved, because the crimped area always is limited to the toothed area.

Moreover, in the case of very fine toothings, as is necessary for a continuous and jerk-free adjustment of the back, fine blanking reaches its technological limits.

The limitations of fine blanking of portions with small corner radii in relation to the thickness of the sheet to be cut and to the quality of the material are well known. Based on experience, a fine blanking severity is defined which distinguishes the severity degrees S1 (easy), S2 (medium) and S3 (difficult) (see "Umformen und Feinschneiden", in Handbuch für Verfahren, Werkstoffe, Teilegestaltung, pages 154 to 165, Verlag Hallwag AG, 1997, Switzerland). Thus the severity degree is essentially defined by the cutting path geometry and the thickness of the metal sheet. For this, the cutting path geometry is divided into simple geometric basic areas such as corner radii, hole diameters, groove and fin widths. From the ratio between a geometric dimension and the thickness of the metal sheet results the severity degree of fine blanking, which grows with growing metal sheet thickness.

This means that obtuse-angled corners with big radii are to be cut better than sharp-cornered with small radii.

Moreover, EP 0 694 434 B1 discloses a hinge for a car seat. This hinge includes a first flange and a second flange, wherein the first flange is firmly connectable to the frame of the back of the seat and the second flange is firmly connectable to the frame of the seat. Both flanges put together form a case clamped together by a ring.

Furthermore, the first flange is equipped with a toothed ring with the teeth directed to the inner side and on a circular slide way may freely rotate in relation to the flange.

Also this known hinge attachment is relatively material consuming and thus weighty and not very convenient to handle in the assembling process.

In view of the state of the art, it is an object of the invention to provide a casing of a hinge attachment and a method for manufacturing such an attachment, wherein the height of the toothed element is significantly bigger than the thickness of the walls of the hinge parts and the hinge parts and the toothed element form a statically compact casing unit, which has a distinctly reduced weight and simultaneously has distinctive flexible assembling characteristics, high stability under load and high accuracy.

SUMMARY OF THE INVENTION

This object is fulfilled through a casing of a hinge attachment of the kind discussed above with a first hinge part connectable to a frame of a back of the seat and a second hinge part connectable to a frame of the seat. The hinge parts include respective perpendicular edges which extend in a direction of a hinge axis, and which abut each other at front ends thereof and thereby, being symmetrically formed with hollows therein, collectively define the casing. A toothed element produced by fine blanking having a generally encircling shape is receivable within the casing, and includes toothing which extends over at least one segment of the generally encircling shape and which is radially directed to an inner side thereof. A clamping ring holds together the edges of the hinge parts, with radially inner sides of the perpendicular edges of the first and second hinge parts being formed as an inner abutment for the toothed element, the toothed element being secured at a bottom face of said toothed element by a seating of each of the first and second hinge parts lying adjacent to the perpendicular edge thereof which is formed into the wall of one of the hinge parts. An outer side of the toothed element is fixed to the perpendicular edge through a connection peripherally extending approximately alongside a central plane of the toothed element at an inner corner of the perpendicular edge of the hinge part or by press-fit engagement and at least one form-fit connection, which substantially secures the toothed element in the direction of the hinge axis and/or prevents twisting about the hinge axis.

The solution according to this invention provides a compact casing of a hinge attachment, the toothed element of which has a thickness at least 1.7-fold bigger than the thickness of the material of the hinge parts. The toothed element gets an internal toothing with small radii, so as to create a large plane of action, which makes it possible to continuously transmit rotating movements in a jerk-free manner, but also big moments without problems. Of special advantage in this connection is that the toothed elements can be used with different heights and widths, so that hinge attachments can be provided, which are appropriate for special or determined loads.

Additionally, teeth width as well as diameter of the toothed element according to the field of application may be respectively varied. The toothed element with an outer surface thereof is supported by the bent off edge of the first hinge part and the edge of the inner surface lies in a seating, so that the toothed element in the direction of the x-axis is secured at its bottom. In the y-axis the toothed element is circularly connected to the edge of the first hinge part, wherein the material connection exists approximately in the middle of the teeth height.

The material connection between toothed element and first hinge part advantageously is carried out by laser welding, but may be realized by any other suitable material connection, such as another welding method or even by an adhesive joint.

Because the toothed element also carries out a supporting function, the thickness of the walls of the hinge parts can be significantly reduced, so that fine blanking and forming of the hinge parts can be realized with more simple and cost-effective tools. The use of multistage, more expensive production processes, is minimized.

Compared with the significantly more complex fine blanking combined with cold flow forming, the hinge parts are produced in simple fine blanking processes and manufactured to finished hinge attachments by a highly effective method.

Further advantages and details will be understood from the following description with reference to the applied figures.

DETAILED DESCRIPTION OF THE INVENTION

Figure 1:
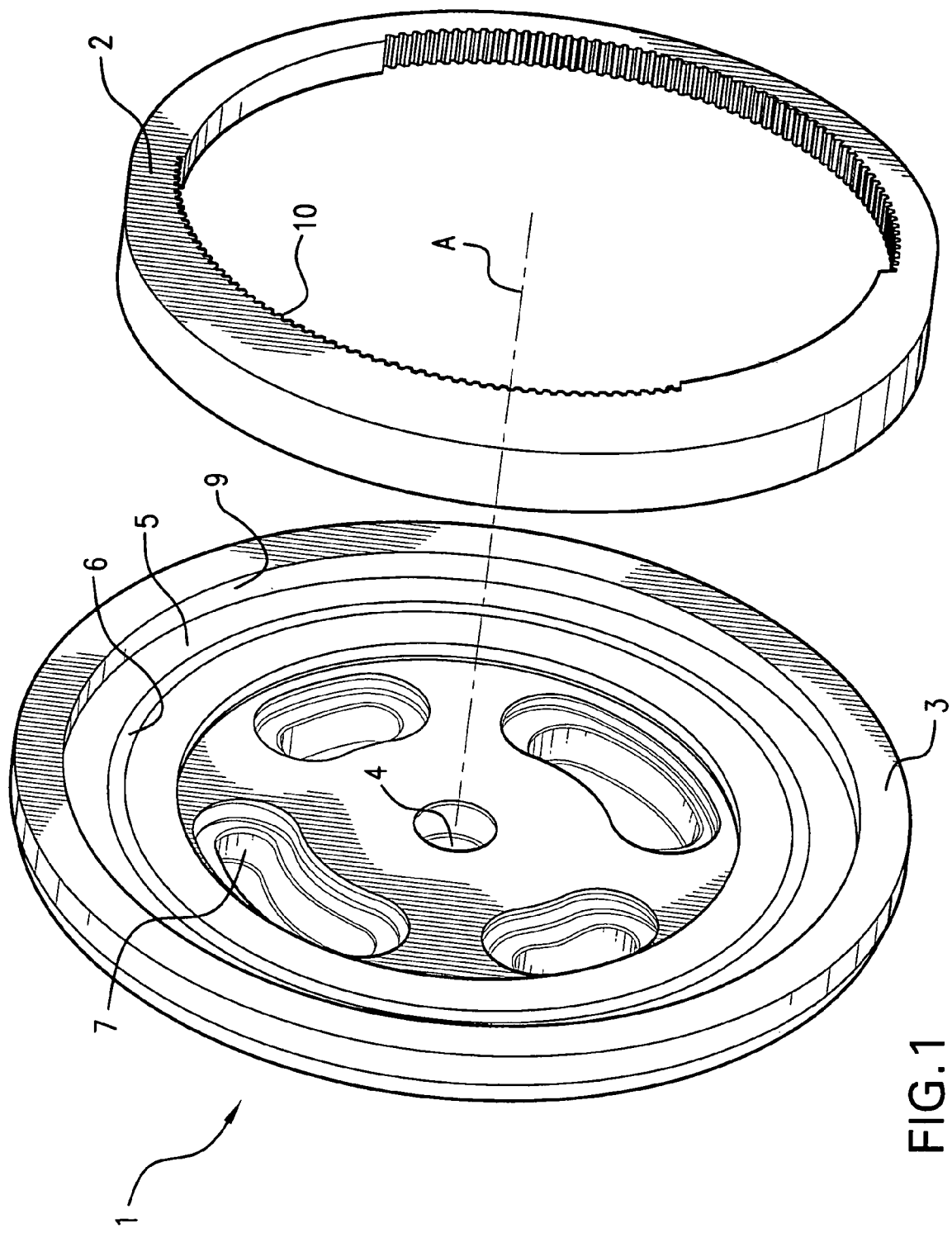
FIG. 1 is a perspective exploded view of a hinge part with a toothed element produced by fine blanking and cold forming.

FIG. 1 shows an exploded view of a first hinge part 1 as one half of a casing and a toothed element 2 with common hinge axis A. In the depicted example, the The first hinge part 1 was produced of a blank (not shown) with a thickness d of 4 mm, by fine blanking and forming. While depicted as circular in the example, the first hinge part is not limited to such geometrical shape. The finished part has a circular edge 3, a central hole 4 for inserting a hinge axle (not shown) along a hinge axis A, a circular plane seating 5 for the toothed element 2 directly adjacent to the inner side of edge 3, a depression 6 disposed concentric with regard to the hinge axis A for forming a circular inner edge, and four ejected recesses 7, which serve for the fixing of the back of the seat to the frame by welding.

The second hinge part 8 has a substantially convergent design as the first hinge part 1, and forms the second half of the casing.

The toothed element 2 has an outer diameter corresponding to the inner diameter of the edge 3. Fine teeth 10 with a radius of for instance 0.3 mm are cut in the inner side 9 of the toothed element 2, which extend over the entire height H of the toothed element 2 and at least over one segment of the circle of element 2. Of course also the whole toothed element 2 may be equipped with teeth throughout an inner side thereof.

The toothed element 2 in this preferred embodiment, in comparison with the thickness d of the first hinge part 1, has a height which is approximately 1.7-fold bigger, and thus is dimensioned significantly stronger. Depending on the height and the width of the toothed element, respective high moments can be received and transmitted. With the use of various toothed elements 2 with different heights and widths, it becomes possible to manufacture hinge attachments with different load limits.

Figure 2:
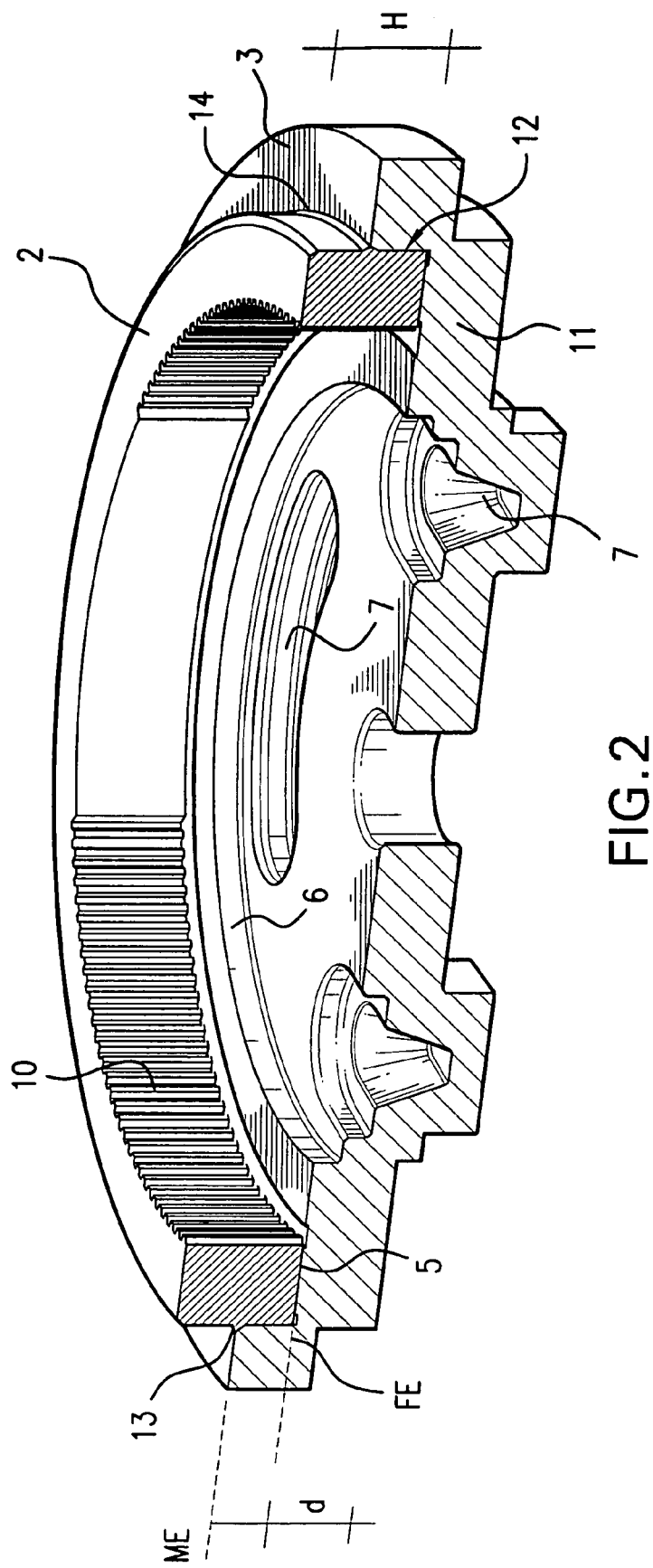
FIG. 2 is a perspective cross-sectional view of a hinge part with an inserted toothed element.

FIG. 2 shows the toothed element 2 inserted into the first hinge part 1. The bottom side of the toothed element 2 lies in the horizontal plane seating 5, directly adjacent to the inner side 11 of edge 3 of the first hinge part 1, and the outer side is supported by the inner side 11 of edge 3, so that the toothed element 2 is secured perpendicular to the hinge axis A. The bent off circular edge 3 thus effectively forms an abutment 12 for the toothed element 2. Because the toothed element 2 in comparison to the wall thickness d of the first hinge part 1 is dimensioned significantly stronger, the edge 3 ends approximately in the central plane ME of the toothed element 2. The edge 3 then lies at a height of the toothed element 2, which corresponds to about 45% of the height of the latter.

Along the central plane ME, the inner line 13 (inner corner) of the edge 3 is materially connected to the toothed element 2 by laser welding. Of course also other welded connections or adhesive connection are suitable. The circular welding connection 14 at the outer line 13 secures the toothed element 2 against detachment in the Y-direction or in the direction of the hinge axis A.

Figure 3:
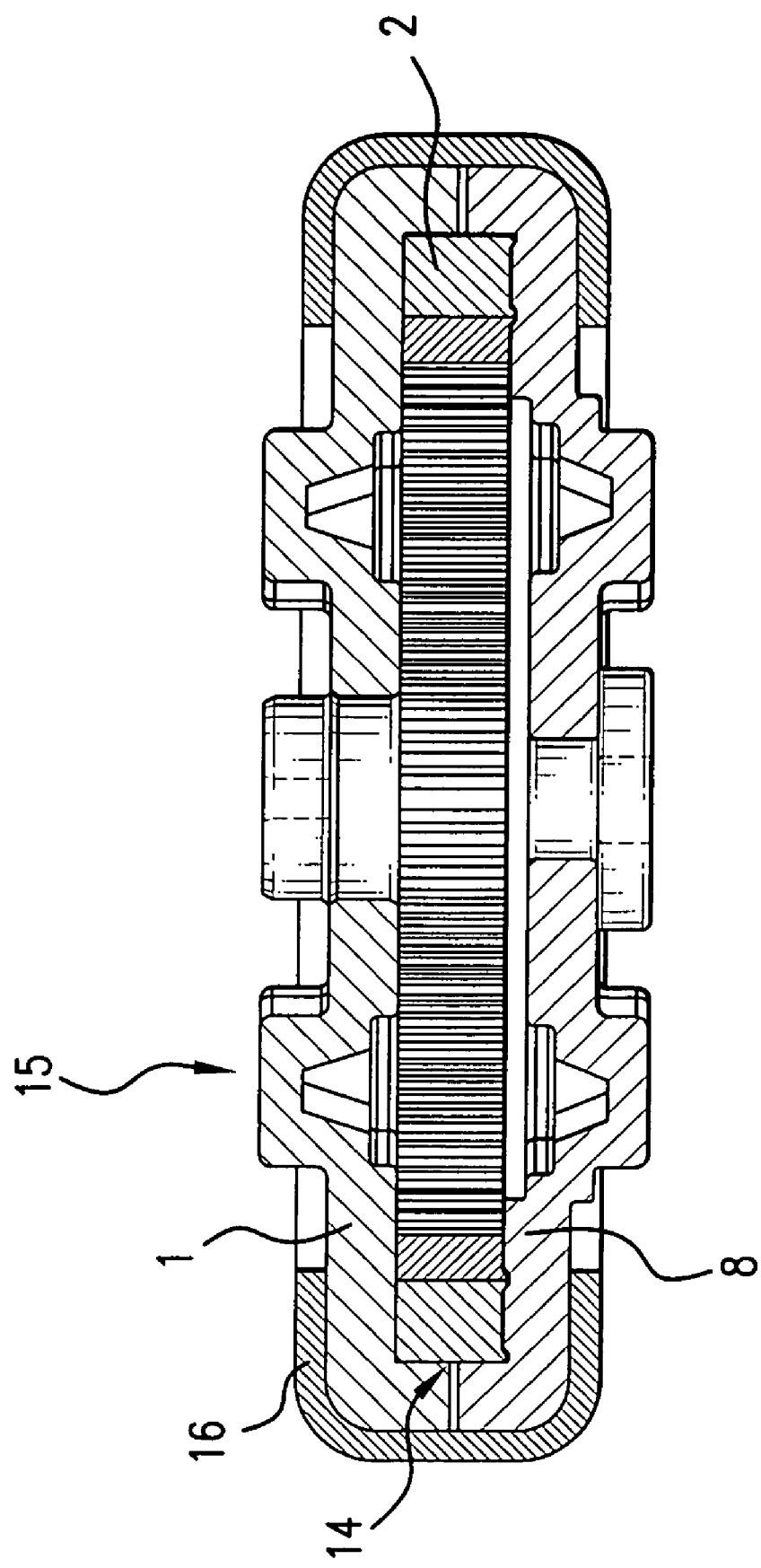
FIG. 3 is a cross-sectional view of a casing of a hinge attachment assembled of a first and a second hinge part.

FIG. 3 shows the casing 15 comprised of the first hinge part 1 with a joint created by welding toothed element 2 and the second hinge part 8. The second hinge part 8 of similar design with its outer edge 3 abuts on the edge of the first hinge part 1. The edges 3 of both casing parts are encompassed by a clamp ring 16, which fixes both parts at each other by clamping.

Figure 4:
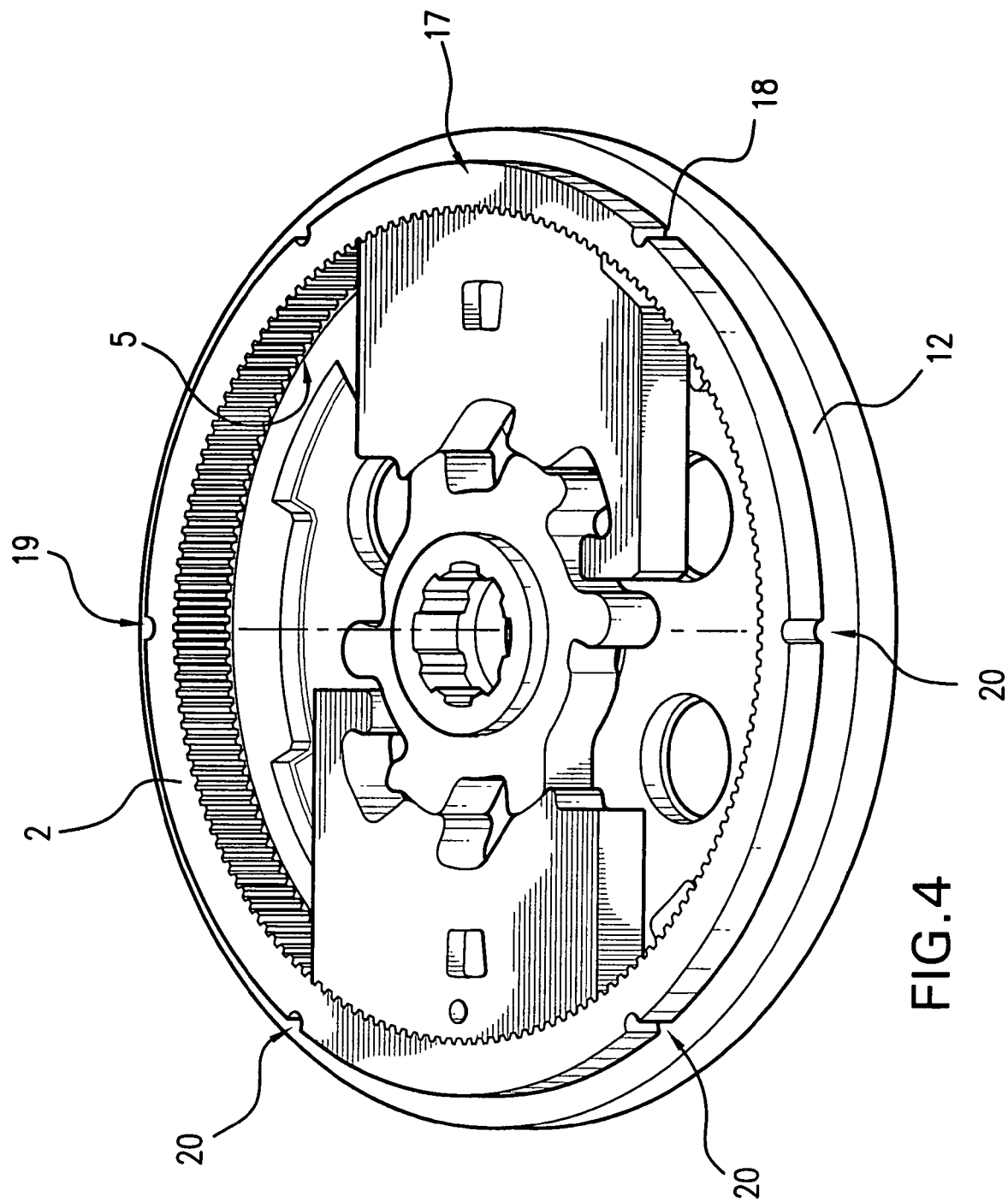
FIG. 4 is a perspective view of a form-fit assembled hinge attachment.

FIG. 4 shows a form-fit connection between toothed element 2 and the abutment 12 of the hinge part 1. At the inner side of the abutment 12 extends the seating 5, which is dimensioned to provide an interference fit when toothed element 2 is inserted. To prevent twisting of the toothed element 2 in relation to the abutment 12 at the vertical wall of abutment 12, beads 18 are formed in regular distances concentrically to the hinge axis A, which when joined form-fit, lie in recesses 19 respectively placed on the outer perimeter of the toothed element 2.

Figure 5:
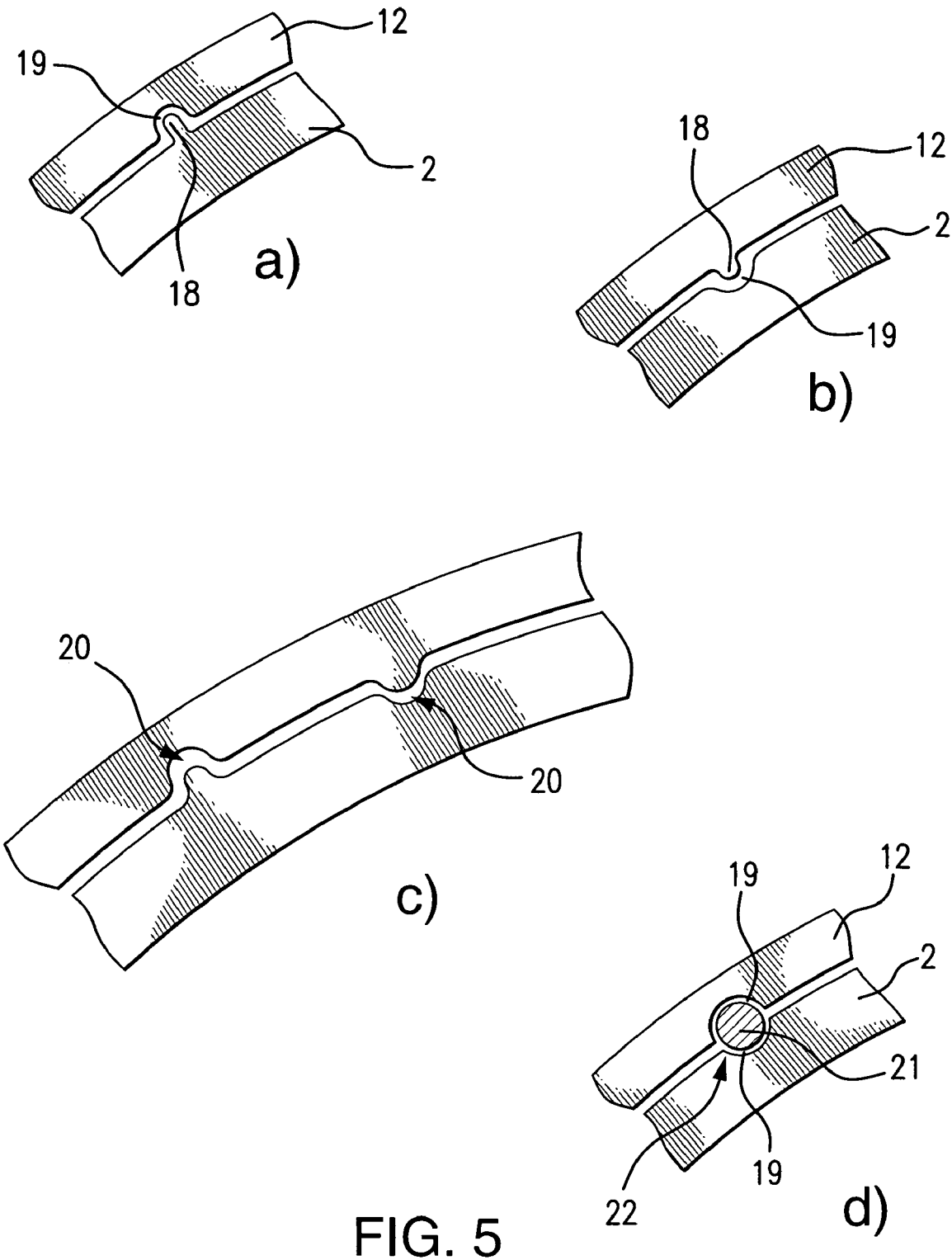
FIGS. 5a to 5d depict possible variants of form-fit connections.

FIGS. 5a to d show possible versions of the form-fit connection between abutment 12 and toothed element 2, wherein in FIG. 5a the arrangement of bead 18 at the toothed element 2 and the respective recess 19 in abutment 12 is shown, in FIG. 5b the version of FIG. 4, in FIG. 5c is shown the alternating arrangement of form-fit connections 20 at the perimeter of abutment 12 and of toothed element 2 is shown, and in FIG. 5d the arrangement of to aligned with each other recesses 19 forming a room 22 for inserting a lock pin 21 is shown.

When assembled and under load, the toothed element 2 respectively supports against the inner wall 11 of edge 3 of the first hinge part 1 and the second hinge part 8. During transmission of the load the force is applied to the toothed element 2, so that in case of a welded connection 14 the latter is not subject to shearing forces.

Where an interference fit between toothed element 2 and abutment 12 occurs, an equal division of the applied forces is applied to the form-fit connections regularly placed on the perimeter, so that a detachment of the interference fit is safely excluded.

With the method according to the invention, a casing 15 for a hinge attachment of a car seat with a wall thickness d of 4 mm is manufacturable. At first, the basic parts 1 and 8 are made from a blanking strip or sheet by conventional fine cutting and forming. Separately, the production of the toothed element 2 is carried out also by fine blanking. The components are produced in simple fine blanking tools, which are all known and the description of which can be omitted herein.

By virtue of inserting the toothed element 2 into the hinge part 1 tailored to the dimensions of the toothed element and welding the same with the toothed element 2 or pressing the toothed element 2 into the seating 5 of the hinge part 1, an assembly suitable for hinge attachments is developed. By choosing a definite height and width of the toothed element 2 a casing 15, a hinge attachment of a car seat can be manufactured for a definite load moment.

LIST OF DRAWING REFERENCES first hinge part 1
toothed element 2
edge of 1 and 8 3
hole 4
seating 5
depression 6
recess 7
second hinge part 8
inner side of 3 9
fine toothing 10
wall of 1 11
abutment 12
inner line of 3 13
welded connection 14
casing 15
clamp ring 16
interference fit 17
bead 18
recess 19
form-fit connection 20
lock pin 21
insertion room 22
hinge axle A
bottom FE
height of 2 H
central plane ME

The invention claimed is:

1. A casing for a hinge attachment of a car seat, wherein first and second hinge parts and a toothed element of the casing are brought to final shape by fine blanking, comprising:
   a first hinge part connectable to a frame of a back of the seat;
   a second hinge part connectable to a frame of the seat;
   the first and second hinge parts including respective perpendicular edges which extend in a direction of a hinge axis, said perpendicular edges of said first and second hinge parts defining confronting surfaces at front ends thereof and thereby, being symmetrically formed with hollows therein, whereby, upon placing the first and second hinge parts in a confronting relationship a casing is collectively defined by the first and second hinge parts;
   a toothed element produced by fine blanking having a generally encircling shape receivable within the casing, said toothed element including toothing which extends over at least one segment of said generally encircling shape and which is radially directed to an inner side thereof; and
   a clamping ring holding together the edges of the hinge parts, radially inner sides of the perpendicular edges of the first and second hinge parts being formed as an inner abutment on the first and second hinge parts for said toothed element, the toothed element being secured at a bottom face of said toothed element by a horizontal seating provided in the first hinge part, the bottom face of the toothed element facing the first hinge part, the horizontal seating lying adjacent to the perpendicular edge of the first hinge part, whereby the horizontal seating is formed in a wall of the first hinge part, the seating in the first hinge part being positioned adjacent the inner abutment of the first hinge part, the seating being dimensioned to provide an interference fit for the toothed element when the toothed element is positioned in the seating, whereby the seating provides an interference fit between the toothed element and the first hinge part when the toothed element is positioned in the seating, an outer side of said toothed element being fixed to the perpendicular edge of one or more of the first and second hinge parts through a connection peripherally extending approximately alongside a central plane of said toothed element at an inner corner of the perpendicular edge of one or more of the first and second hinge parts, which substantially secures the toothed element in the direction of the hinge axis, wherein the toothed element provides a support function such that the wall thickness of the first and second hinge parts is reduced to allow the first and second hinge parts to be substantially brought into final shape by fine blanking with simpler, more cost effective tools.

2. A casing according to claim 1, wherein the connection is a welding connection between the perpendicular edge of the first hinge part and the toothed element.

3. A casing according to claim 2, wherein the welding connection is a laser welding connection.

4. A casing according to claim 1, wherein the connection is an adhesive connection between the perpendicular edge of the first hinge part and the toothed element.

5. A casing according to claim 4, wherein said adhesive connection is a metal adhesive connection.

6. A casing according to any one of claims 1 to 4, wherein a height of the inner abutment of each of the first and second hinge parts corresponds to approximately 45% of a height of the toothed element.

7. A casing according to claim 6, wherein a particular height, width and/or diameter of said toothed element is selected to suit a particular load.

8. A casing according to any one of claims 1 to 4, wherein a particular height, width and/or diameter of said toothed element is selected to suit a particular load.

9. A casing according to any one of claims 1-4, wherein the toothed element has a closed ring or oval shape.

10. A casing according to any one of claims 1-4, wherein the first and second hinge parts have a circular or oval shape.

11. A casing for a hinge attachment of a car seat, wherein first and second hinge parts and a toothed element of the casing are brought to final shape by fine blanking, comprising:
   a first hinge part connectable to a frame of a back of the seat;
   a second hinge part connectable to a frame of the seat;
   the first and second hinge parts including respective perpendicular edges which extend in a direction of a hinge axis, said perpendicular edges of said first and second hinge parts defining confronting surfaces at front ends thereof and thereby, being symmetrically formed with hollows therein, whereby, upon placing the first and second hinge parts in a confronting relationship a casing is collectively defined by the first and second hinge parts;

a toothed element produced by fine blanking having a generally encircling shape receivable within the casing, said toothed element including toothing which extends over at least one segment of said generally encircling shape and which is radially directed to an inner side thereof; and a clamping ring holding together the edges of the hinge parts, radially inner sides of the perpendicular edges of the first and second hinge parts being formed as an inner abutment on the first and second hinge parts for said toothed element, the toothed element being secured at a bottom face of said toothed element by a horizontal seating provided in the first hinge part, the bottom face of the toothed element facing the first hinge part, the horizontal seating lying adjacent to the perpendicular edge of the first hinge part, whereby the seating is formed in a wall of the first hinge part, the seating in the first hinge part being positioned adjacent the inner abutment of the first hinge part, the seating being dimensioned to provide an interference fit for the toothed element when the toothed element is positioned in the seating, whereby the seating provides an interference fit between the toothed element and the first hinge part when the toothed element is positioned in the seating, at least one form-fit connection being provided in the inner abutment of one or more of the first and second hinge parts and in the toothed element, which prevents a twisting of the toothed element in the seating around the hinge axis, wherein the toothed element provides a support function such that wall thickness of the first and second hinge parts is reduced to allow the first and second hinge parts to be formed by fine blanking with simpler, more cost effective tools.

12. A device according to claim 11, wherein the form-fit connection between the abutment and toothed element includes at least one bead concentrically oriented to the hinge axis formed on an outer side of the toothed element and to which is allocated a respective recess formed in the abutment of the first and second hinge parts with which the bead form-fittingly engages when the toothed element is pressed into the horizontal seating of the first hinge part.

13. A device according to claim 11, wherein the form-fit connection between the abutment and toothed element includes at least one recess concentrically oriented to the hinge axis formed on an outer side of the toothed element and which to which is allocated a respective bead formed in the abutment of the first and second hinge parts with which the recess form-fittingly engages when the toothed element is pressed into the horizontal seating of the first hinge part.

14. A device according to claim 11, wherein the form-fit connection between abutment of the first and second hinge parts and toothed element includes:

at least one recess formed into the abutment of the first and second hinge parts at inner sides of the first and second hinge parts and the toothed element at an outer side thereof; and a lock pin tailored to dimensions of the recess, wherein the recesses form a room for pressing in the lock pin when they are aligned to each other during pressing of the toothed element into the horizontal seating of the first hinge part.

15. A device according to any one of claims 11 to 14, wherein form-fit connections in regular distances are placed at a perimeter of the toothed element and the abutment of the first and second hinge parts.

16. A device according to claim 15, wherein six of said form-fit connections are provided in total between the toothed element and the abutment of the first and second hinge parts.

17. A device according to any one of claims 11 to 14, wherein the form-fit connections include, in alternating arrangement, a bead at the toothed element and a recess in the abutment of the first and second hinge parts, and a recess in the toothed element and a bead on the abutment of the first and second hinge parts.

18. A method for manufacturing a casing for hinge attachments of a car seat according to claim 1 or 11, comprising:

employing fine blanking and forming to create a final shape of the first and second hinge parts and the toothed element, matching the first and second hinge parts to the toothed element according to the dimensions of the first and second hinge parts and the toothed element, the dimensions being preselected prior to fine blanking and forming; and assembling the first hinge part, toothed element, and second hinge part and providing a connection between at least one of the first hinge part, the second hinge part, and the toothed element.

19. The method according to claim 18, wherein the fine blanking and forming includes hobbing and drawing.

20. The method according to claim 18, further comprising providing a material connection between at least one of the first hinge part, the second hinge part, and the toothed element.

21. The method according to claim 18, further comprising providing a form-fit connection between at least one of the first hinge part, the second hinge part, and the toothed element.

22. The method according to claim 18, further comprising providing a material connection between at least one of the first hinge part, the second hinge part, the material connection being one of welding and adhesive bonding.

23. The method according to claim 18, further comprising providing a form-fit connection between at least one of the first hinge part, the second hinge part, and the toothed element, the form-fit connection being provided by friction between at least one of the first hinge part, the second hinge part, and the toothed element.

* * * * *